(Model.)

H. C. H. KRAUSE & H. B. SCHNEIDER.
PHOTOGRAPHIC NEGATIVE RIBBON FOR CAMERA BOXES.

No. 497,884. Patented May 23, 1893.

UNITED STATES PATENT OFFICE.

HUGO C. H. KRAUSE AND HERMAN B. SCHNEIDER, OF CHICAGO, ILLINOIS.

PHOTOGRAPHIC-NEGATIVE RIBBON FOR CAMERA-BOXES.

SPECIFICATION forming part of Letters Patent No. 497,884, dated May 23, 1893.

Application filed July 6, 1891. Serial No. 398,511. (Model.)

*To all whom it may concern:*

Be it known that we, HUGO C. H. KRAUSE and HERMAN B. SCHNEIDER, residents of the city of Chicago, in the county of Cook and State of Illinois, have jointly invented certain new and useful Improvements in Photographic-Negative Ribbons for Camera-Boxes, of which the following, in connection with the drawings accompanying and forming a part hereof, is a full and complete description, sufficient to enable those skilled in the art to understand and make the same.

Our invention relates to photographic ribbons for sensitized negative plates for use in that class of photographic camera-boxes by which more than one negative can be taken without opening the same, suitable negative plates or films of any character being contained within the camera-box of this design the negative films and the camera-box being relatively constructed and adapted to be brought in back of the lens of the camera and in a properly focused position for receiving the image thereon, transmitted through the lens, of the object or objects to be photographed.

The object of this invention is to obtain a negative ribbon for a camera-box of the class named by means of which a number of negative plates can be exposed, in rotation, without refilling the same with negatives therefor; to obtain a negative ribbon for such camera-box, whereby the position upon the negative plate of the object about to be photographed can be readily determined, or found, as it is termed, and to obtain a ribbon wherein the negative plates or films employed can be so placed so that when such ribbon is contained in such camera-box, a person not skilled in a camera or in the manipulating of the same can properly control and handle them in the taking of photographic negatives by such camera.

We have illustrated our invention by the drawings accompanying and forming a part hereof, in which—

Figure 2:
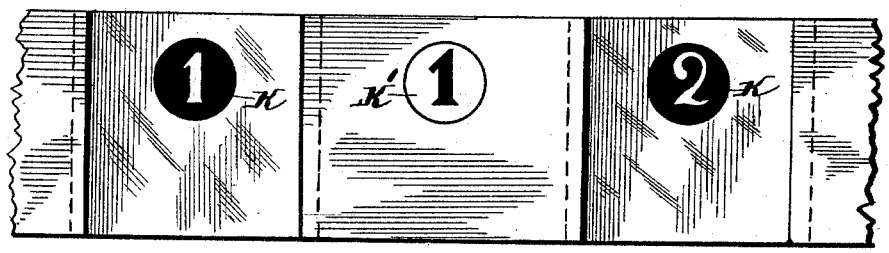
Figure 1:
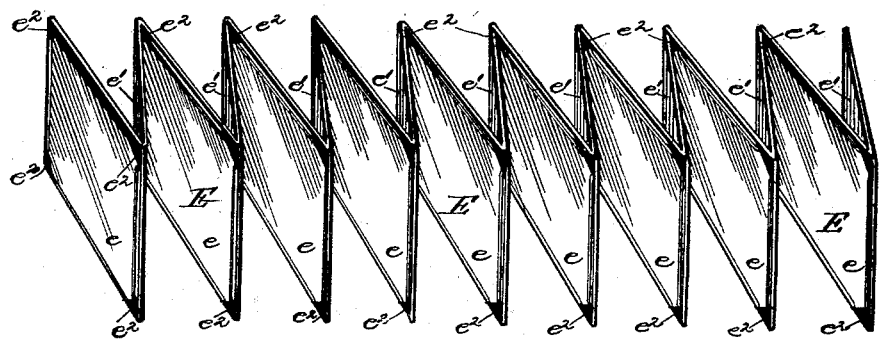

Figure 1, is a perspective view of a photographic negative plate or film ribbon of our invention, and Fig. 2, a rear elevation of a section of such photographic negative plate ribbon in a modified form.

Like letters are used to indicate a part, where more than one view of such part is given, throughout the several illustrations thereof.

E, is a ribbon having flexible plates or films $e$ alternating with portions of the ribbon $e'$ whereon no plates or films are placed. This ribbon E is composed of leaves of flexible negative films or plates alternating with leaves of paper or cloth.

$e^2$, Fig. 1, are corner pieces attached on the flexible ribbon at suitable distances apart so that the corners of the flexible film or plate $e$ may be caught thereunder and held therein.

In the modification shown in Fig. 2, alternate negative plates or films are connected together by alternate sheets of paper or cloth attached by glue or cement to the edges of the flexible negative films or plates.

In the ribbon illustrated in Fig. 1, the flexible negative films or plates $e$ are placed thereon by engaging with the corners thereof underneath corner pieces $e^2$, $e^2$, $e^2$, $e^2$ in the dark room, and the ribbon is then folded and placed in a camera-box adapted therefor, with one end of the ribbon E carried around a suitable roller whereby movement of the ribbon can be effected without opening the camera-box.

When the ribbon is constructed in the manner illustrated in Fig. 2, it can be used but once, and when the ribbon is made (under a ruby light), it is folded closely together in the manner clearly indicated in Fig. 1, but with the flexible negative films or plates laying in substantially parallel planes, and then packed in a box in a suitable manner so that when such ribbon plate is to be used it can be taken directly from the box, and put into the receptacle therefor in a camera-box, (this also being done in the dark room; that is, under a ruby light.)

It is well known to those skilled in the use of photographic cameras of the description for which this ribbon is adapted that the ground glass upon which the object to be photographed is usually thrown and properly focused, cannot be used, as the entire back of the camera-box is at all times closed or covered by the ribbon on which the photographic films or plates are placed, and hence, other means for focusing the device are required. In order to enable one to focus our ribbon in a camera-box and to place the ribbon in a proper position in such camera-box, without using the finding lens and glass ordinarily employed in such camera-boxes, we have made the following inventions.

The alternate leaves of the ribbon E containing, as described, the flexible photographic negative film e, are made either of white cloth or paper, or painted white upon the side thereof receiving the image through the lens of the camera in which the sensitized plate is exposed, when the same is properly focused. Numbers lettered, respectively, K, K', are placed on the back of the leaves of the ribbon E in such position that when one of said numbers K is opposite a peep-hole of ruby glass suitably placed in the back of the camera-box in which the device is used a negative film or plate is in position to be exposed, and will be exposed by the removing of the cover to the lens of the camera-box, and when one of the figures K' is in front of the peep-hole of ruby glass the white or whitened surface of the cloth or paper e' extending between the negative or sensitized films e, e, is in position to have focused thereon the image which is to be photographed. By constructing the portion e' of the ribbon E extending between the flexible sensitized films e, and attaching them together, of thin white cloth or paper, and particularly of paraffine paper, or tracing cloth, translucent leaves are obtained. In such cases, after placing the part of the ribbon E connecting such negative film or plates in proper position by placing the number K' back of the peep-hole of ruby light in the back of the camera-box a door provided therefor in such back may be opened and the image observed from the back of the portion e' of the ribbon E, by the use of a dark cloth, in the usual manner in which the lens is focused on ground glass. It will be observed that where the figures lettered K are, say, white, on a colored back-ground the figures lettered K' should be colored and the back-ground thereof white, or some other and equivalent way of distinguishing the figures on the part of the ribbon whereon the negative or sensitized films are placed from the part of the ribbons between such negative films, (and connecting them together,) as the ribbon is viewed through the peep-hole of ruby light, must be adopted.

It is evident that where the ribbon, illustrated in Fig. 1, is constructed with the leaves e', e', of paper, the pockets $e^2$, $e^2$, may be dispensed with provided the leaves e' are attached to leaves $e^2$ by glue or cement but such ribbon can be used but once, and that the principal purpose of the pockets is to obtain a ribbon in which the plates, now in use, can be carried, by inserting the corners thereof as hereinbefore described, in the pockets, and that such ribbon can be used more than once by refilling the same with films in the dark room.

Having thus described our invention, what we claim as new, and desire to secure by Letters Patent of the United States, is—

1. A photographic negative ribbon of non-sensitized flexible material provided with pockets, in combination with leaves of sensitized flexible film, the corners whereof are adapted to fit into the pockets on the non-sensitized flexible material and to be thereby attached thereto; whereby a ribbon is obtained having alternate leaves of sensitized and non-sensitized material; substantially as described.

2. In a photographic negative ribbon, the combination of alternate leaves of sensitized flexible film with leaves of non-sensitized flexible translucent material, such leaves of sensitized flexible film being attached to the ribbon of non-sensitized flexible translucent material so that by removing the back of the camera-box in which the ribbon is placed when the translucent portion of the ribbon is in suitable position the lens of the camera can be focused thereon; substantially as described.

3. In a photographic negative ribbon, the combination of alternate leaves of sensitized flexible film, with alternate leaves of non-sensitized flexible material, numbers on the back of the portion of the ribbon of sensitized flexible film and corresponding numbers on the back of the non-sensitized portion of the ribbon, but of different color, whereby, when the ribbon is placed in a camera-box and the numbers are viewed through a peep-hole of ruby light in the back thereof, the portion of the ribbon exposed to the lens of the camera and its exact position can be determined; substantially as described.

HUGO C. H. KRAUSE.
HERMAN B. SCHNEIDER.

Witnesses:
LUTE S. ALTER,
CHARLES T. BROWN.